April 3, 1951 J. A. VERHEYDEN ET AL 2,547,183
CLOSURE FASTENER FOR FOOD STORAGE CONTAINERS
Filed Nov. 6, 1945 3 Sheets-Sheet 2
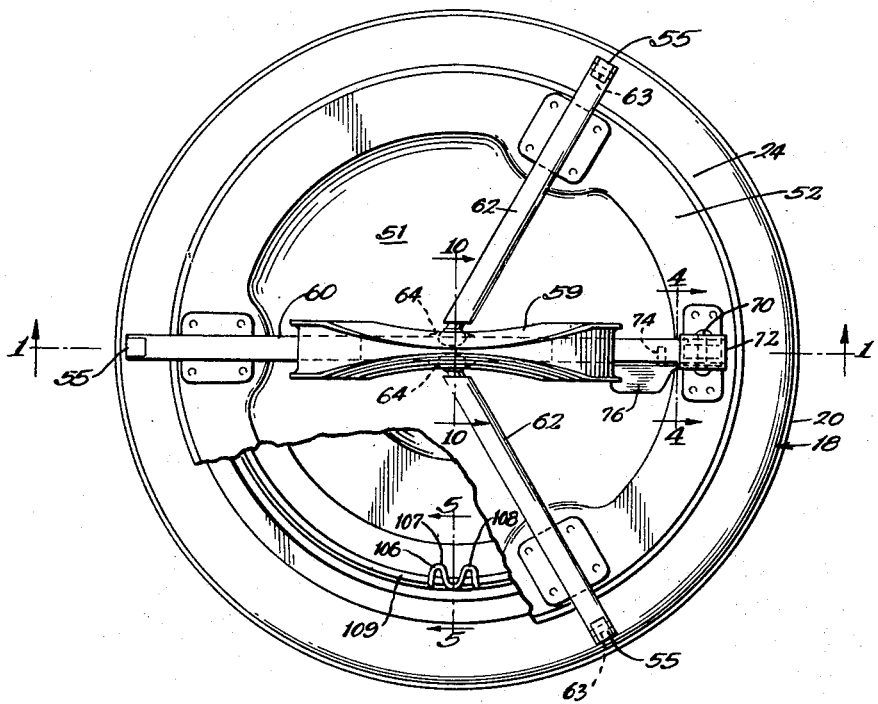
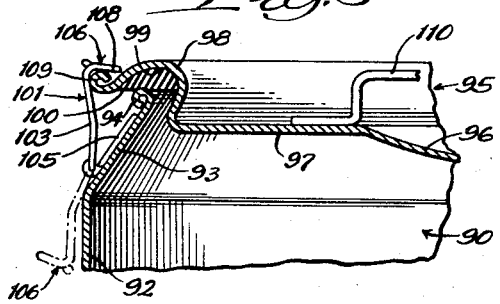
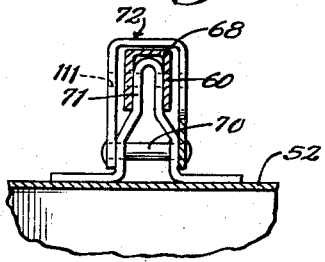
INVENTORS:
James A. Verheyden
and Frank Haloski,
By Soans, Pond & Anderson
ATTORNEYS April 3, 1951   J. A. VERHEYDEN ET AL   2,547,183
CLOSURE FASTENER FOR FOOD STORAGE CONTAINERS
Filed Nov. 6, 1945   3 Sheets-Sheet 3
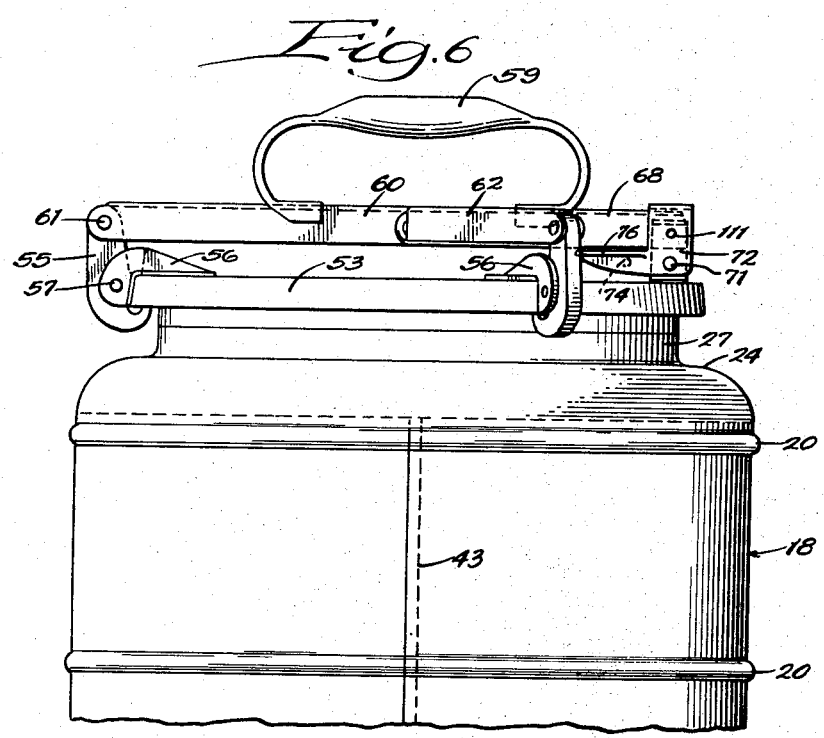
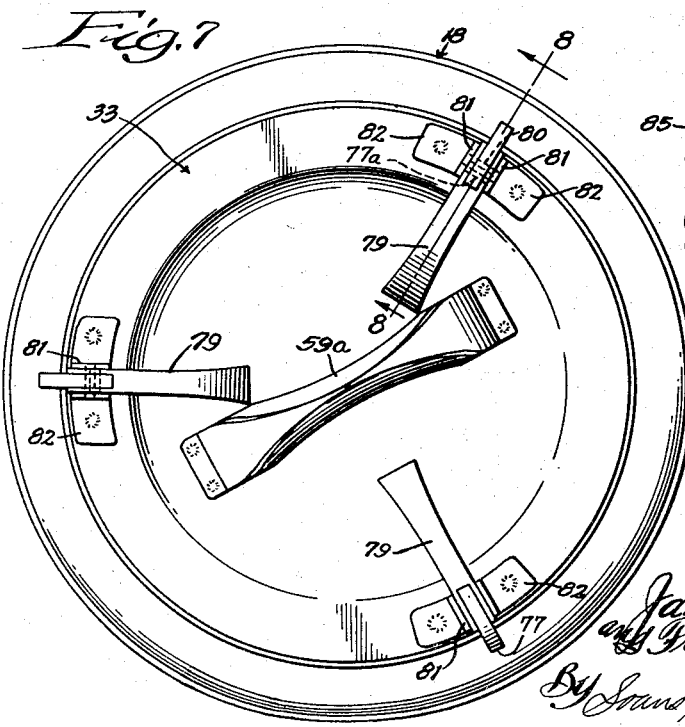
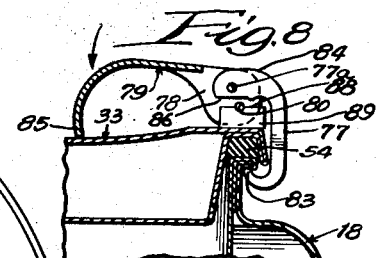
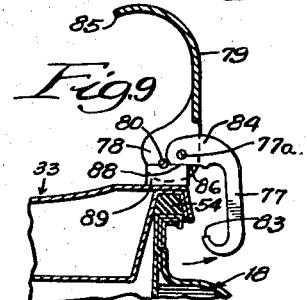
INVENTORS:
James A. Verheyden
and Frank Hatoski
By Evans, Pond & Anderson
ATTORNEYS Patented Apr. 3, 1951

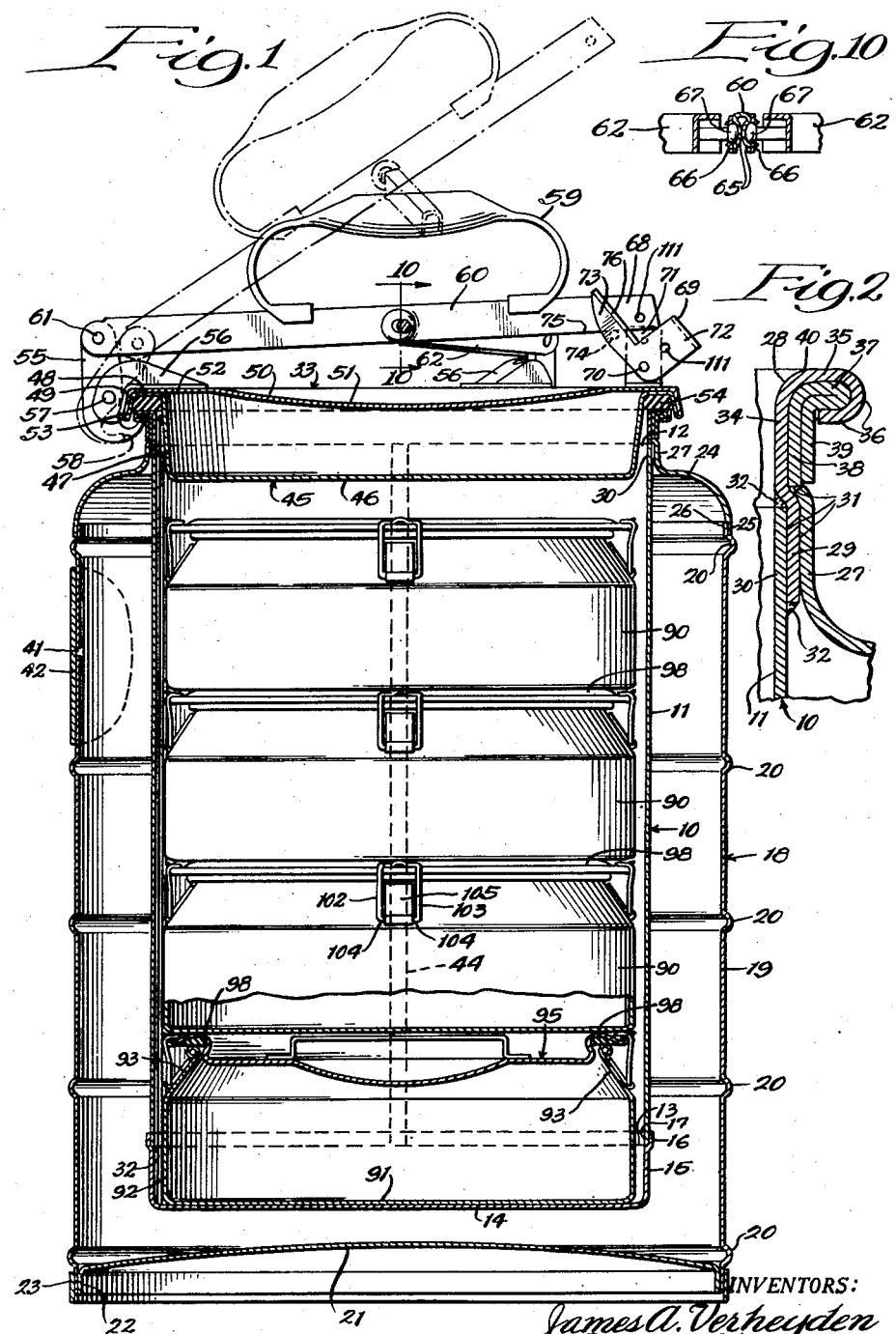

2,547,183

UNITED STATES PATENT OFFICE

2,547,183

CLOSURE FASTENER FOR FOOD STORAGE CONTAINERS

James A. Verheyden, Oak Lawn, and Frank Haloski, Chicago, Ill., assignors to Vacuum Can Company, a corporation of Illinois Original application June 10, 1944, Serial No. 539,626. Divided and this application November 6, 1945, Serial No. 627,036

4 Claims. (Cl. 220—55)

This application is a division of our copending U. S. application Serial Number 539,626, now Patent No. 2,519,862, dated August 22, 1950.

This invention relates to containers designed particularly for the purpose of storing foods in such a manner as to maintain the temperature thereof for a considerable period of time, and although the device herein disclosed is particularly designed for food storage purposes, it will be apparent that it may have other similar uses.

In general, the container herein disclosed embodies an inner container and an outer container interconnected at their mouth ends, and so related that the inner container is elsewhere spaced from the outer container to provide a chamber which may be vacuumized to thereby produce an efficiently insulated inner container which will be adapted to store food (or other materials), and to maintain the temperature of the food for a considerable period of time.

A cover or closure for the insulated container is provided, the cover being also preferably of an insulated construction to cooperate with the insulated container to maintain the temperature of the stored food.

In connection with the insulated container structure, a plurality of food containing pans, each having its own cover, are provided for positioning within the insulated container. The food pans are preferably of such size that they will fairly snugly but freely removably fit within the inner container, and they are arranged one upon the other in the inner container.

The main objects of the invention are to provide an improved insulated container structure which can be produced economically and at relatively low cost; to provide such a container wherein the inner member is effectively supported from its mouth end portion in the desired spaced relation to the outer container; to provide a cover structure which may also be made economically and at relatively low cost, but which will be highly efficient in respect of its insulating properties; to provide means for effectively sealing the joint between the cover and the container when the cover is applied to the container; to provide means whereby the cover may be easily applied or removed while at the same time attaining the desired effective seal between the cover and the container; to provide an inner container or pan structure including a removable cover which may be releasably locked to the pan proper by means located wholly within the outer periphery of the pan; to provide pan cover sealing means which will effectively prevent leakage of the contained foods from the pan when the cover of the pan is locked in place on the pan; and, in general, it is the object of the invention to provide a temperature-maintaining storage container of the class described.

Other objects and advantages of the invention will be understood by reference to the following specification and accompanying drawings (three sheets) wherein there is illustrated a temperature-maintaining food storage container embodying a selected form of the invention, together with a modification thereof.

In the drawings, Fig. 1 is a vertical sectional view through the axis of the container selected for illustration herein; the plane of the section of Fig. 1 is indicated by the line 1—1 of Fig. 3.

Fig. 2 is a fragmentary enlargement of a portion of the structure, corresponding to a portion thereof shown in Fig. 1;

Fig 3 is a plan, certain portions being broken away to reveal certain interior details;

Figs. 4 and 5 are sections respectively on the lines 4—4 and 5—5 of Fig. 3;

Fig. 6 is a side elevation of the upper portion of a container corresponding to the container shown in Fig. 1, but illustrating a modified form of cover construction;

Fig. 7 is a plan of the construction shown in Fig. 8;

Fig. 8 is a section on the line 8—8 of Fig. 7;

Fig. 9 is a section corresponding to Fig. 8 but showing a changed position of certain parts; and Fig. 10 is a fragmentary section on the line 10—10 of Figs. 1 and 3.

The temperature-maintaining food storage container herein disclosed comprises an inner container or receptacle 10, preferably made of stainless steel, a sheet of which is rolled into cylindrical form to provide the side wall 11 of the inner container. The side wall part of the body terminates at its upper end, as indicated at 12, and at its lower end as indicated at 13. A bottom member 14, also preferably of stainless steel, is stamped or otherwise formed from a sheet of said material so as to provide an upwardly extending cylindrical flange part 15, an upper marginal portion 16 of which is offset outwardly to provide a seat for the lower marginal portion 17 of said cylindrical body member. A lapped seam is thus formed between the upper marginal portion of the bottom member 14, and the side wall member 11, and said seam is preferably welded continuously around the circumference of the container so as to provide an air-tight joint between the parts.

The cylindrical container bodies may, of course, be formed from tubular metal, if preferred. However, such tubular metal is substantially more expensive than sheet metal, the difference in cost being more than enough to offset the added cost of rolling the sheets into cylindrical form and uniting the meeting edges. As shown in the drawings, the outer container body part has its meeting edge portions lapped at 43, and the inner container wall part is similarly lapped as indicated at 44. These lapped joints are preferably welded, or otherwise united continuously throughout the length of the respective laps to provide air-tight joints.

In forming the vertical lap seams 43 and 44, one marginal portion is preferably offset outwardly to the extent of the thickness of the sheet metal, so that the inside surface, especially with respect to the inner container, is smooth and continuous, or flush at the joint.

The offsetting may be reversely arranged with respect to the outer container so as to maintain the outside surface smooth, or flush at the joint, although this is of less importance than the maintenance of a smooth inside surface in the inner container.

The outer container 18, also preferably formed of stainless steel, comprises a cylindrical side wall member 19 formed of a sheet of the said material rolled to the desired cylindrical form. Circumferentially extending reinforcing ribs, such as indicated at 20, are also preferably rolled into the outer container side wall so that notwithstanding the thinness of the sheet material from which the outer container is formed, and notwithstanding a fairly large diameter, the outer container will maintain its desired cylindrical form. The outer side wall structure 19 is provided with a bottom member 21 which may be formed by stamping or by any other suitable method, said bottom member being preferably arched upwardly from its periphery as shown. At its periphery, the bottom member is provided with a flange 22, the outside diameter of the flanged portion of the bottom member being such that it fits snugly within the lower marginal portion of the side wall member 19. The joint between the flange 22 of the bottom member and the adjacent lower marginal portion of the side wall 19 is preferably welded continuously around the body so as to provide an air-tight joint between the parts. Although welding is mentioned, it will, of course, be understood that equivalent securing means such as brazing and soldering may be employed. The bottom of the outer container is reinforced by means of an annular band 23, which fits tightly around the outside of the lower marginal portion of the cylindrical side wall 19. Said reinforcing band 23 is preferably, although not necessarily, in the form of an endless band, and it is suitably secured permanently in place on the container body. It may be spot welded at points spaced around the circumference of the container, or it may be brazed, or otherwise secured.

The upper end portion of the side wall 19 of the outer container is connected to the upper end of the inner container side wall as best shown in Figs. 1 and 2. A suitably shaped collar 24 has a lower marginal portion 25 of such size that it will fit snugly around the upper marginal portion 26 of the outer container, and preferably against the shoulder formed by the uppermost bead 20. The joint between the marginal portions 25 and 26 is also preferably welded continuously around the container to form an air-tight joint between the parts. The upper portion of the collar 24 is reduced in diameter, and is provided with an upwardly extending neck or flange part 27, the inside diameter of which is slightly greater than the outside diameter of the upper marginal portion of the inner container. An end member 28, preferably of endless annular form, is provided with a lower marginal portion 29, which is interposed between the upper marginal portion 30 of the inner container and the said neck or flange portion 27 of the outer container collar 24. Said end member 28 may first be welded to the marginal portion 30 of the inner container, the welding being made continuous around the circumference of the structure, so as to provide an air-tight joint between the parts, and the upper marginal portion 27 of the collar 24 may thereafter be welded continuously around the circumference of the structure to the flange portion 29. The welding effect between the parts 30, 29 and 27 may be in the form of seam welds, such as indicated at 31.

Slight spaces left between the ends of the various parts and adjacent members may be filled with welding metal or solder, as indicated at 32 for finishing purposes, and for further assuring air-tight joints between the parts.

The end member 28 has its upper portion 34 offset inwardly relative to its lower flange portion 29 so that said upper portion 34 is in coaxial alignment with the said wall 11 of the inner container. An upper marginal portion of the end member is turned outwardly, as indicated at 35, and then downwardly and inwardly as shown at 36 to embrace a reinforcing member 37. The reinforcing member 37 may be in the form of a stainless steel sheet member folded upon itself and rolled into annular form so as to provide the inner and outer legs 38 and 39 respectively, the upper or folded edge portion of the member being bent outwardly to form the horizontally extending flange part which is embraced by the end member portions 35 and 36.

As best shown in Fig. 2, the neck or flange part 27 of the collar 24 has its upper edge portion swaged or otherwise offset inwardly to conform to the outer surface of the end member 28. The two-ply reinforcing member comprising the legs 38 and 39 adds sufficient thickness to the end member 28 to cause the outer diameter of the leg 39 to equal or exceed the outer diameter of the neck part 27, whereby not only strength is imparted to the mouth end of the container, but appearance is somewhat improved.

The described mouth end construction is of considerable importance because of the rigidity attained by it. It will be readily understood that the mouth end of the container is subject to a considerable amount of bumping, and other forces which tend to deform it. Inasmuch as the upper surface portion 40 of the mouth end is relied upon for forming an air-tight joint between the mouth of the container and the cover, it is particularly important that said surface 40 be smooth and free from dents or other irregularities. The described reinforced construction is very effective in maintaining a smooth sealing surface 40 on the mouth end of the container.

The inner container 10 is rigidly united to the outer container incident to the described mouth construction, and the inner container is thereby held rigidly in predetermined spaced relation to the outer container, which is of such increased diameter relative to the inner container as to provide the desired amount of insulating space between them. Similarly, the length or depth of the inner container relative to the depth of the outer container is such that the desired amount of insulating space is also provided between the bottoms 14 and 21 of the inner and outer containers.

The space between the inner and outer containers may be vacuumized by suitable exhausting means connected to said space through a port 41 provided in the side wall of the outer container, preferably near its upper end as shown. When the insulating chamber has been suitably exhausted, the port 41 may be closed by means of a name plate, or like member 42, which may be soldered, or otherwise secured to the wall of the container.

A cover 33 for the insulated container is also preferably of insulated construction. In this instance, a cover is shown as comprising an inner pan-shaped member 45, embodying an inner wall 46 and a slightly upwardly and outwardly flaring peripheral flange 47. At its upper end, the flange 47 is turned outwardly to provide a substantially horizontal portion 48, and then downwardly and slightly upwardly, as shown at 49. The outer, or top, member 50 of the cover embodies a central portion 51, which is slightly concaved or dished downwardly from a surrounding peripheral portion 52, which is substantially parallel to the plane of the portion 48 of the inner member. The outer member 50 is also provided with a peripheral flange portion 53 which is bent downwardly over the outside of the peripheral flange portion 49 of the inner member, and securely united thereto. The lower edge portion of the peripheral flange 53 may be rolled inwardly over the lower edge of the peripheral flange 49 of the inner member to secure the inner and outer parts together. The mutually lapping flange portions 49 and 53 may also be welded together continuously around the circumference of the cover member so as to provide an air-tight joint between the parts. A satisfactory degree of vacuum is obtained in the space between the cover members 46 and 51 by uniting these parts while quite hot, so that when the heated air contained between the parts cools, it becomes somewhat rarefied. If desired, additional provision may be made for exhausting the hollow part of the cover by suitable pump means.

The depending peripheral flanges 49 and 53 of the inner and outer members of the cover cooperate with the flange portion 47 of the inner member to form a fairly deep channel, in which there is positioned a moderately soft, heat-proof rubber or like gasket 54. The gasket may fit snugly enough around the flange portion 47 to be frictionally held against separation from the cover when the latter is removed from the container, whereby said gasket will remain associated with the cover at all times.

Suitable clamp means is provided for locking the cover in place on the mouth end of the container, the means being preferably such that the cover will be clamped against the mouth end of the container with sufficient force to at least slightly compress the gasket member 54, to thereby effectively seal the joint between the cover and the container.

The cover attaching means shown in Figs. 1, 3 and 4 comprises three equally spaced hooks 55, respectively pivoted to the cover structure through the agency of suitable brackets, such as indicated at 56, and pivot pins such as indicated at 57. The brackets 56 may be of stamped sheet metal construction, embodying upstanding parallel side flanges and laterally extending base flanges which may rest on and be spot welded, or otherwise secured to, the flat peripheral portion 52 of the upper cover member 50. The lower end portions of the hooks 55 are so shaped that when the upper portions thereof are rocked outwardly, the lower ends 58 of the hooks will engage against the underside of the laterally outwardly extending mouth rim of the container structure, with sufficient force to require some compression of the sealing gasket 54.

The three locking dogs 55 are interconnected for simultaneous operation. For this purpose, there is provided a handle member 59 on a diametrically disposed bar 60. One end of the bar 60 has one of the locking hooks 55 pivotally connected to it, as shown at 61, and the other end of the bar 60 is adapted to cooperate with a locking member, which will presently be described. The other two locking hooks 55 are connected to the locking bar 60 by means of links 62—62 which are pivotally connected at their outer ends, as indicated at 63, to the respective locking hooks 55. The inner ends of the links 62—62 are pivotally connected to the bar 60 substantially in alignment with the axis of the cover, ball and socket connections such as indicated at 64 being provided for this purpose. As shown in Fig. 10, the bar 60 is provided with inwardly offset portions 65 forming inner socket portions, and with suitably formed annular members 66 secured to the outside of the bar to cooperate with the portions 65 thereof to form the required ball retaining socket. The connecting links 62 have secured to them ball members 67 which are anchored in the sockets formed in said bar 65.

It will be seen that when the parts are properly proportioned, the links 62, together with one portion of the bar 60, constitute a three-armed toggle, which when pressed downwardly will spread the upper arm portions of the locking hooks 55, to thereby cause the hooks to engage the mouth rim of the container, as already explained. An over-the-center locking effect may be obtained by so proportioning the parts that the central connection 64 between the arms of the toggle structure, will pass downwardly beyond the plane of the pivots 61. The resiliency of the gasket 54 is sufficient to permit such over-the-center toggle action, whereby the cover structure is made self-locking on the container.

For positively locking the hooks in cover-attaching position, there is provided a locking device adapted to engage the free end 68 of the bar 60. This locking device consists of a member 69, pivoted as shown at 70 on a bracket element 71, which is rigidly secured to the cover and extends upwardly therefrom. The locking member 69 comprises an inverted U-shaped portion 72 and a lever part 73 which extends inwardly from one of the sides of the U-shaped part 72. The lever part 73 carries a pin 74, which is engageable by the lower edge 75 of the bar 60. When the bar 60 is pressed downwardly to lock the cover in place, its lower edge 75 engages the pin 74, and thereby rocks the locking member 69 in such a direction as to cause its inverted U-shaped part 72 to move over the free end portion 68 of the bar 60, as is best illustrated in Fig. 4.

It will be apparent that when upward force is applied to the bar 60, the U-shaped locking part 72 will be effective to prevent upward movement of the bar 60 relative to the cover structure, and further that since the direction of force applied by the outer end portion 68 of the bar, against the overlying part of the locking member is substantially upwardly, there is no tendency to rock said member 72 outwardly to the disengaged position in which it is illustrated in Fig. 1.

For unlocking the structure to permit the bar 60 to be raised, the arm portion 73 is provided with a ledge or flange 76 to facilitate manual rocking of the member 72 to the unlocked position shown. Such outward rocking of the member 72 also causes the pin 74 to engage the lower edge of the bar 60, and to effect an initial upward movement of the bar 60 which may, if desired, be sufficient to break the over-the-center lock already described. Then, when the cover structure is grasped, and lifted upwardly by means of its handle 59, the locking hooks 55 will be completely disengaged from the rim of the container, so that the cover may be removed therefrom. The unlocked position of one of the hooks 55 is illustrated in dotted lines in Fig. 1.

It will be seen that when the cover is applied and locked to the container by the described locking hook 55, the container may be carried about by means of the handle 59. When the cover is to be removed, the locking member 69 is adjusted to open position, and the cover pulled upwardly through the agency of the handle 59, whereby the locking hooks are automatically rocked outwardly so as to be disengaged. The locking hooks 55 are maintained in their unlocked position so long as the cover is suspended from the handle 59, so that when the cover is to be applied to the container, said hooks are automatically held in an out or open position, permitting the cover to be set in place without any interference from the locking hooks. Locking of the cover is accomplished merely as a continuation of the application of the cover to the container by continuing the downward movement of the handle 59 and bar 60, which automatically rocks the locking hooks to locking position, as already explained. The downward movement of the hook-actuating bar 60 is limited by engagement of the free end portion 68 of the bar 60 with the upper end portion of the bracket member 71, as clearly shown in Fig. 4. Hence, downward movement of the member 60 to the required over-the-center locking position is limited to the proper extent.

The cover structure may be simplified somewhat by providing a series of independently manually adjustable locking devices, thereby to eliminate the interconnecting three-arm toggle structure of the above described construction. Such a modified arrangement is shown in Figs. 7, 8 and 9.

In the modified arrangement, the cover 33 embodying the same inner, outer and rim construction as previously described, is provided with three relatively independent, radially arranged locking members spaced uniformly around the circumference of the cover. Each locking member embodies a hook member 77, which is pivotally connected at its upper end, as shown at 77a, to an end portion 78 of a lever 79. Each lever 79 is pivoted, as indicated at 80, to and between a pair of upstanding ears 81—81 which have base ears 82—82 welded or otherwise fixedly secured to the top of the cover near its periphery. The hook 77 has its lower end provided with an upwardly facing portion 83, which is adapted to engage under the rim of the container. The upper end portion of the hook 77 is provided with an inwardly extending arm part 84, through which the pivot 78 extends to connect the hook member to the operating lever 79. The pivot 77a is so located with reference to the pivot 80 that when the hook member 77 is in cover locking position, there is an over-the-center locking effect which is sufficient to normally prevent self, or unintentional release of the locking hooks. As best shown in Fig. 8, the axis of the pivot 77a is located sufficiently to the left or inwardly of the axis of the pivot 80 that a line of force drawn through the axis of the pivot 77a and through the rim engaging hook portion 83 will be to the left or inwardly of the axis of the pivot pin 80, wherefore the expansive force of the sealing gasket 54 will tend to rock pivot 77a counterclockwise around the pivot 80, rather than in the opposite direction which would effect releasing of the locking hook. The counterclockwise, or over-the-center locking action of the hook 77 is limited by engagement of the free end 85 of the operating lever 79 with the top of the cover structure.

When it is desired to open the container, each of the hooks 77 is released, or opened, by lifting the respective levers 79 upwardly. Upward and outward, or clockwise rocking movement of the lever 79 when viewed in the position of Fig. 8, first effects movement of the locking hook pivot 77a over the axis of the pivot 80, to thereby overcome the over-the-center, or self-locking action already described. When the said over-the-center locking action is overcome, the expansive force of the gasket 54 aids the unlocking movement, which is completed by continuing the movement of the operating lever 79 to the upwardly extending position substantially as illustrated in Fig. 9. The opening movement of the lever 79 is limited to the position illustrated by engagement of a surface portion 86 of the hook part 84 with the top surface 88 of a stop member, or block 89, which is mounted on the top of the cover under the path of movement of said hook portion 84 and between the ears 81—81. Said engagement of the hook member 77 with the block member 89 serves also to maintain the hook member 77 in its fully opened position, as shown in Fig. 9, whereby said locking hooks are held out of the way to permit unhindered application of the cover to the container. As shown in Fig. 9, most of the locking hook is disposed outwardly of the pivot 80 when the hook is in open or unlocked position so that the outboard weight of the hook will normally automatically maintain the hook and the lever 79 in the illustrated open position. When the cover is properly applied to the container, the operating arms 79 of the locking device may be rocked inwardly and downwardly to effect the locking engagement, as described and as illustrated in Fig. 8. When the locks 77 are in cover-locking position, the container may be carried about through the agency of the handle 59a which, in this instance, is secured directly to the top member of the cover structure.

The container, as described, is adapted to house a plurality of relatively independent food pans, which may be of more or less conventional construction. However, it is preferred that the food pans each be provided with its own cover structure, and it is further preferable that the food pans be of such size that they will occupy substantially all of the space within the container without being such a snug fit that the insertion and removal of the pans will be resisted by a piston-like action in the inner container. It is also preferable that the cover for each food pan be independently locked to its own pan.

Accordingly, there are provided a series of pans, in this instance four pans respectively designated 90. Each of the pans 90 comprises a pan proper, or receptacle, having a bottom wall 91, an annular side wall 92, an upper marginal portion 93 of which is turned inwardly at an inclined angle, as shown in Figs. 1 and 5. The free upper edge of the angularly extending portion 93 may be rolled upon itself, as shown at 94, to provide a smooth and non-cutting mouth end for the pan. Each pan 90 is provided with its own cover 95. In this instance, each cover 95 embodies a centrally downwardly dished or concave portion 96, a horizontal surrounding portion 97 and a peripheral portion 98, which is suitably formed to provide a downwardly facing channel 99, wherein there is positioned a suitable rubber, or other resilient material gasket 100. The gasket 100 is adapted to engage the rim 94 of the food pan, and to cooperate with said rim and the peripheral channel portion of the cover to provide a substantially air-tight joint between the cover and the pan. To maintain such an air-tight joint, the pans are provided with a series of locking clips 101 adapted to engage circumferentially spaced portions of the cover. In one embodiment of the structure, four clips, such as the clips 101, are provided at equally spaced distances around the circumference of the pan.

Each clip 101 comprises a wire loop having side arms 102 and 103 (see Figs. 1 and 5), lower end portions of which are bent toward each other to form pivot members 104, which are received within a positioning clamp or member 105, which is riveted, or otherwise secured fixedly in place on the inclined portion 93 of the band body.

The upper ends of the side arms 102 and 103 are joined by a cross member 106. The cross member 106 is bent to provide a pair of projecting loop portions 107 and 108 respectively, which are adapted to extend inwardly over the beaded rim 109 of the cover 95, as clearly shown in Figs. 3 and 5. As shown, the angle existing between the plane of the arm portions 102 and 103, and the plane of the loop portions 107 and 108 is preferably an acute angle. The wire clip is formed of metal which is somewhat resilient, so that the clip may be so proportioned that when the loop portions 107 and 108 thereof are forced over the rim 109 of the cover, there will be a slight stretching of the clip to thereby enable each clip to clampingly hold the cover in place. The side arms 102 and 103 of the clips are preferably bent slightly, as shown in Fig. 5, so that the stretching action referred to may tend to straighten out the said arms. The clips 101 may be readily disengaged by thumb pressure applied against the upper ends of the clips. The clips are effective to clamp the cover to the pan with sufficient force to require enough compression of the cover gasket 100 to insure tight sealing of the pan.

Each cover is provided with a handle member 110 which straddles the downwardly dished central portion 96 of the cover, whereby adequate finger space is provided to facilitate lifting of the cover by means of the handle. The handle may be spot welded, or otherwise secured to the cover.

The food pans, including their covers, are of an outside diameter which will fit freely within the main container, as shown in Fig. 1. In the arrangement shown, the pans have flat bottoms so that each pan may be seated on the top surface of the cover portion 98 without any interlocking or nesting relationship. If desired, the pan bottoms may be provided with a slight annular recess, which will register with and receive the upwardly projecting annular portion 98 of the cover of another unit for stacking and nesting purposes. However, provision of such a channel results in the provision of an upwardly extending rib on the inside of the food pan bottom, and such a rib interferes somewhat with the process of cleaning the pan. The mounting of the cover-fastening clips 101 on the inwardly inclined portions 93 of the food pans keeps the clips within the outside diameter of the food pans so that no space allowance in the food container is required for the clips.

The described structure has been found to be highly efficient and practical. However, certain changes in the details may be made without departing from the invention.

We claim:

1. A container having a mouth opening, and a laterally outwardly extending mouth flange surrounding said mouth opening, a cover for said container adapted to be seated on said mouth flange for closing said opening, a plurality of locking members pivotally mounted on said cover adjacent the periphery thereof and having lower end portions movable laterally inwardly and upwardly of said flange so as to be engageable with the bottom side of said flange for locking the cover to the container, a plurality of arms respectively pivotally connected to the upper end portions of said locking members and also to each other, the pivot connections between said arms and locking members being disposed in a plane common to all and the interconnected ends of said arms being movable transversely of said plane for effecting adjustment of said locking members to and from locking engagement with said flange, and releasable means for maintaining said locking members in locking engagement with said flange.

2. A container having a mouth opening, a laterally outwardly extending mouth flange surrounding said mouth opening, a cover for said container adapted to be seated on said mouth flange for closing said opening, a plurality of locking members pivotally mounted on said cover adjacent the periphery thereof and having lower end portions movable laterally inwardly and upwardly of said flange so as to be engageable with the bottom side of said flange for locking the cover to the container, a plurality of arms respectively pivotally connected to the upper end portions of said locking members and also to each other, the pivot connections between said arms and locking members being disposed in a plane common to all and the interconnected ends of said arms being movable transversely of said plane for effecting adjustment of said locking members to and from locking engagement with said flange, one of said arms having a portion extending beyond the pivotal connection between said arms, and means adjustably mounted on said cover for engaging said extended arm portion when said locking members are in locking engagement with said flange, thereby to lock said locking members in said locking engagement.

3. A container having a mouth opening at its upper end and downwardly facing external abutment means adjacent said upper end, a cover adapted to be seated on said end of the container to close said mouth opening, a plurality of locking members movably mounted on said cover and having portions releasably engageable with said abutment means for locking the cover to the container, a plurality of arms overlying said cover and having outer end portions respectively pivotally connected to said locking members and inwardly disposed portions pivotally interconnected, a handle carried by one of said arms for facilitating manual movement of said inwardly disposed arm portions toward and from the cover to thereby effect endwise shifting of the outer end portions of said arms and movement of said locking members selectively into engagement with and disengagement from said abutment means, thereby to selectively lock the cover to and release the same from said container, releasable means for locking said arms in cover-locking position whereby the container may be transported by means of said handle, and means for moving said releasable means to arm locking position as an incident to movement of said arms to cover locking position.

4. A container having an end provided with a mouth opening and a laterally outwardly extending flange around said end, a cover adapted to be seated on said end of the container for closing said mouth opening, a plurality of locking hooks movably mounted on said cover and engageable with said flange for locking the cover to the container, a plurality of arms having outer end portions respectively pivotally connected to said locking hooks, said arms extending radially inwardly from said hooks and having inner end portions interconnected approximately centrally of said cover member, said inner arm portions being movable toward and from the cover to thereby effect radial movement of said outer end portions and adjustment of said locking hooks to and from locking engagement with said flange, one of said arms being extended beyond said central connection, means carried by said cover for engaging the free end of said extended arm to lock the same in cover-locking position, and a handle secured to said extended arm for facilitating manipulation of said arms and locking members and constituting a handle for transporting the container when the cover is locked thereon.

JAMES A. VERHEYDEN.
FRANK HALOSKI.

REFERENCES CITED

The following references are of record in the file of this patent:

UNITED STATES PATENTS

| Number | Name | Date |
|---|---|---|
| 438,030 | Strout | Oct. 7, 1890 |
| 1,698,916 | Kocher | Jan. 15, 1929 |
| 1,951,559 | Pyott | Mar. 20, 1934 |

FOREIGN PATENTS

| Number | Country | Date |
|---|---|---|
| 27,653 | Switzerland | Oct. 21, 1903 |
| 38,096 | Netherlands | Apr. 17, 1936 |
| 522,459 | Germany | Apr. 9, 1931 |
| 625,075 | France | Apr. 19, 1927 |